United States Patent [19]

Bontrager

[11] 3,981,529
[45] Sept. 21, 1976

[54] LIFT MECHANISM FOR A CAMPER TOP
[76] Inventor: Lloyd J. Bontrager, 60311 County Road 35, Middlebury, Ind. 46540
[22] Filed: Sept. 22, 1975
[21] Appl. No.: 615,776

[52] U.S. Cl. .................................. 296/23 C; 52/66
[51] Int. Cl.² ............................................ B60P 3/32
[58] Field of Search ................. 296/23 R, 23 C, 26, 296/27; 52/66, 67

[56] References Cited
UNITED STATES PATENTS

| | | | |
|---|---|---|---|
| 3,492,041 | 1/1970 | Logan | 296/23 R |
| 3,495,866 | 2/1970 | Bontrager | 296/27 |
| 3,674,305 | 7/1972 | Steury | 296/27 |
| 3,885,826 | 5/1975 | Kropf | 296/23 R |

Primary Examiner—M. H. Woods, Jr.
Assistant Examiner—John A. Carroll
Attorney, Agent, or Firm—Oltsch & Knoblock

[57] ABSTRACT

A camper having a wheeled body and a top shiftable between collapsed and elevated positions relative to the body. A crank mechanism having a friction-held ratchet wheel is utilized to raise and lower the top between its extended and collapsed positions. In one direction of rotation of the crank mechanism the ratchet wheel is interlocked for rotation with the crank mechanism and in turn interlocks with a pawl to prevent reverse rotation of the crank mechanism as the top is raised. Reverse rotation of the crank mechanism releases the ratchet to permit movement of the lift mechanism relative to the ratchet wheel and a lowering of the top.

7 Claims, 9 Drawing Figures

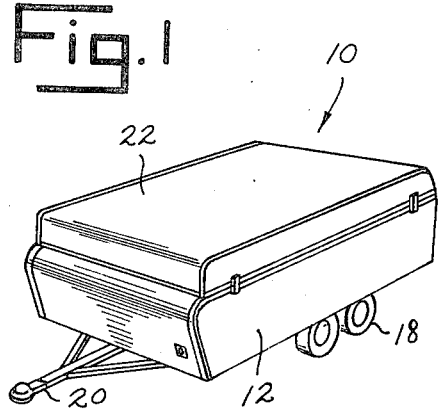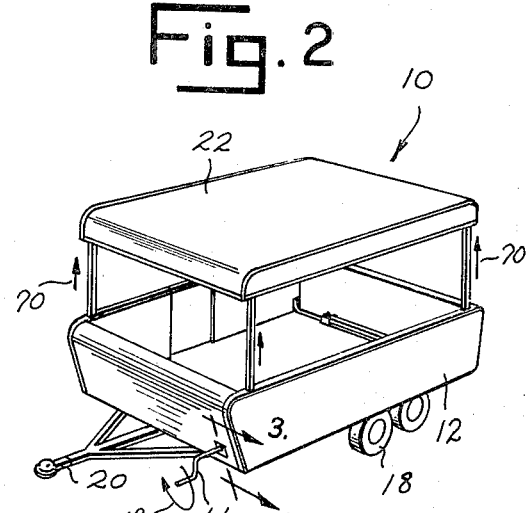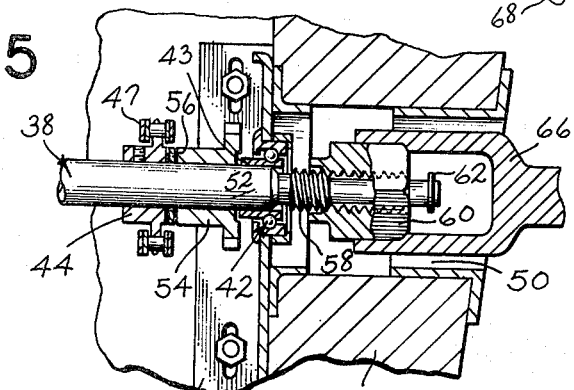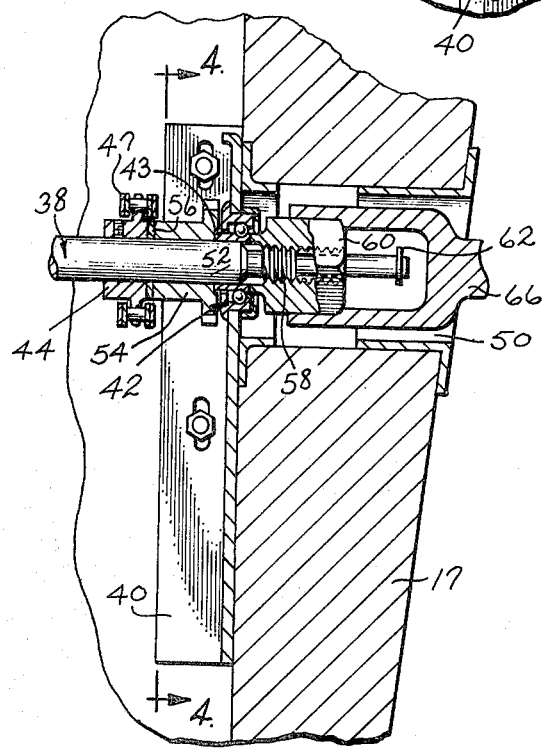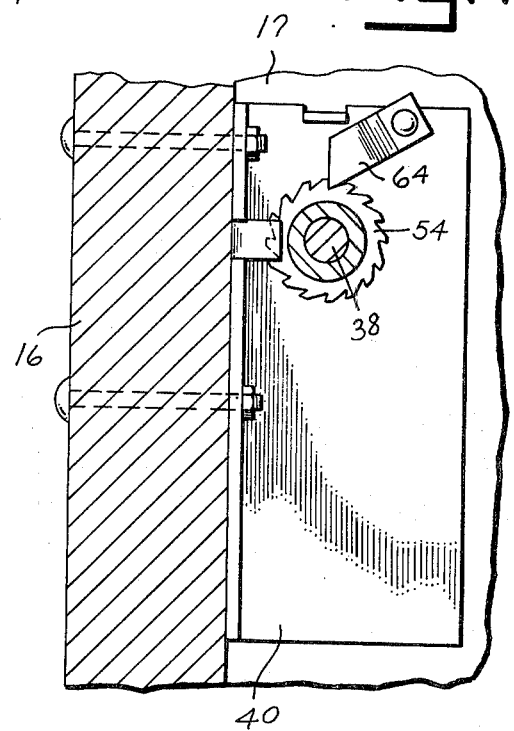

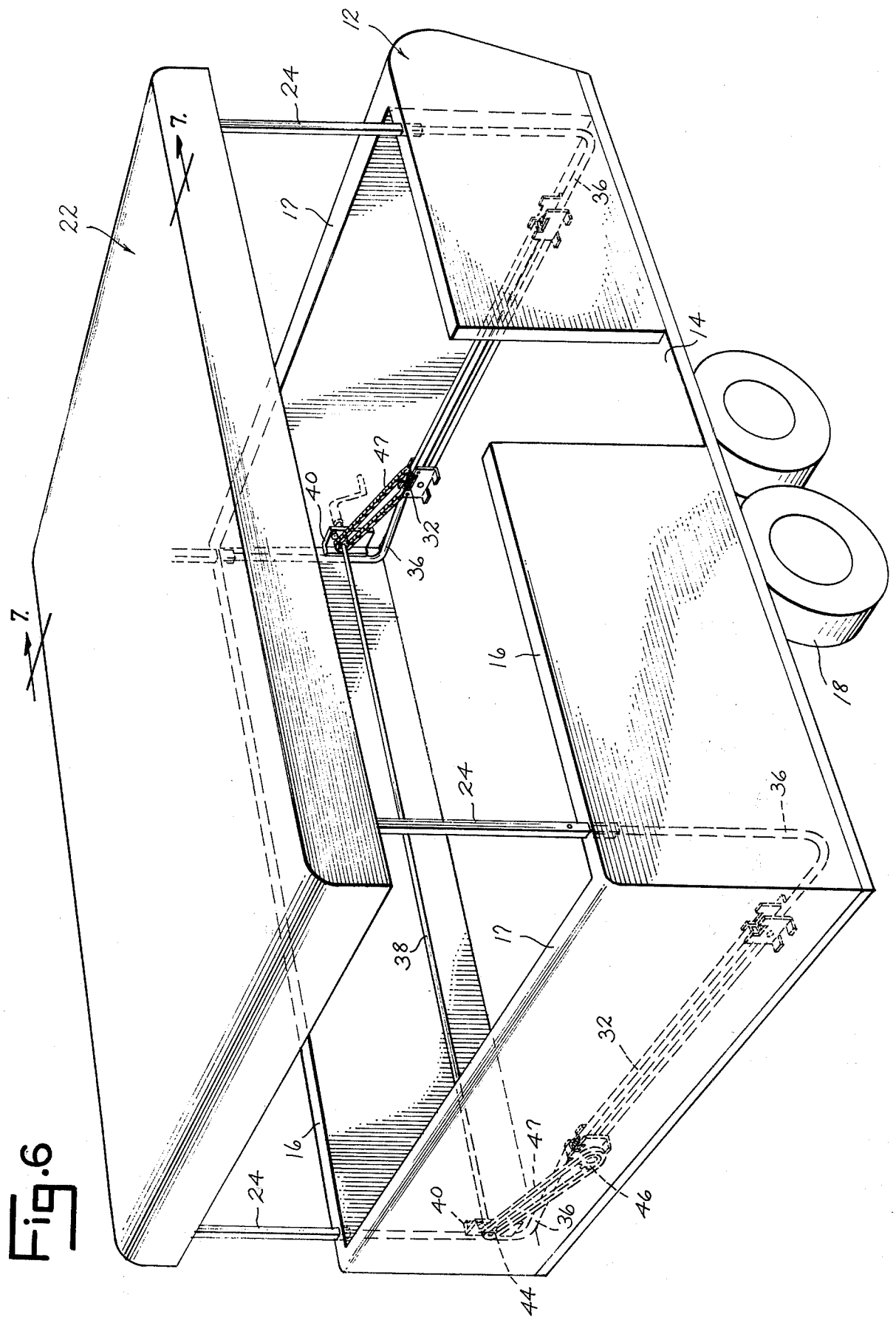

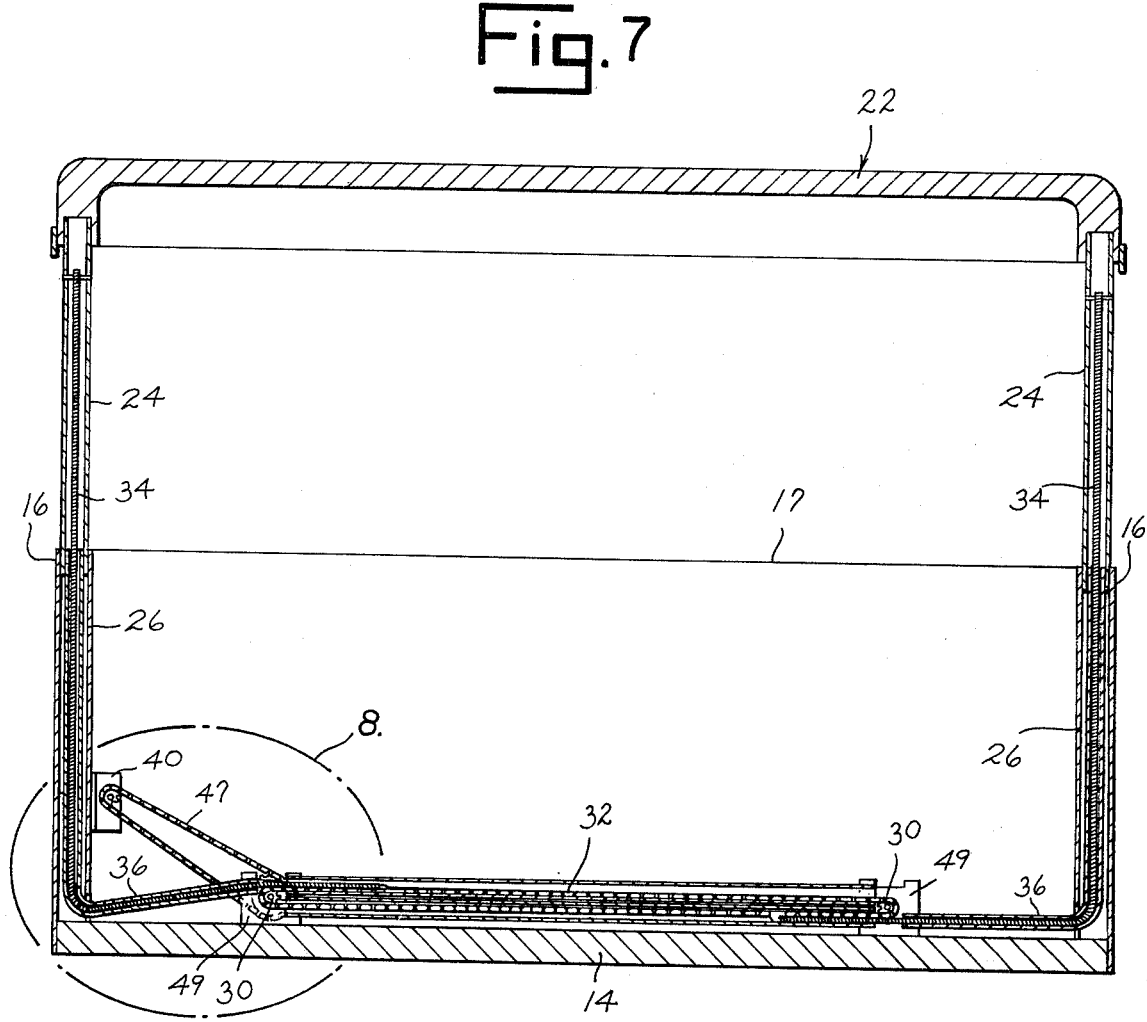
Fig. 7
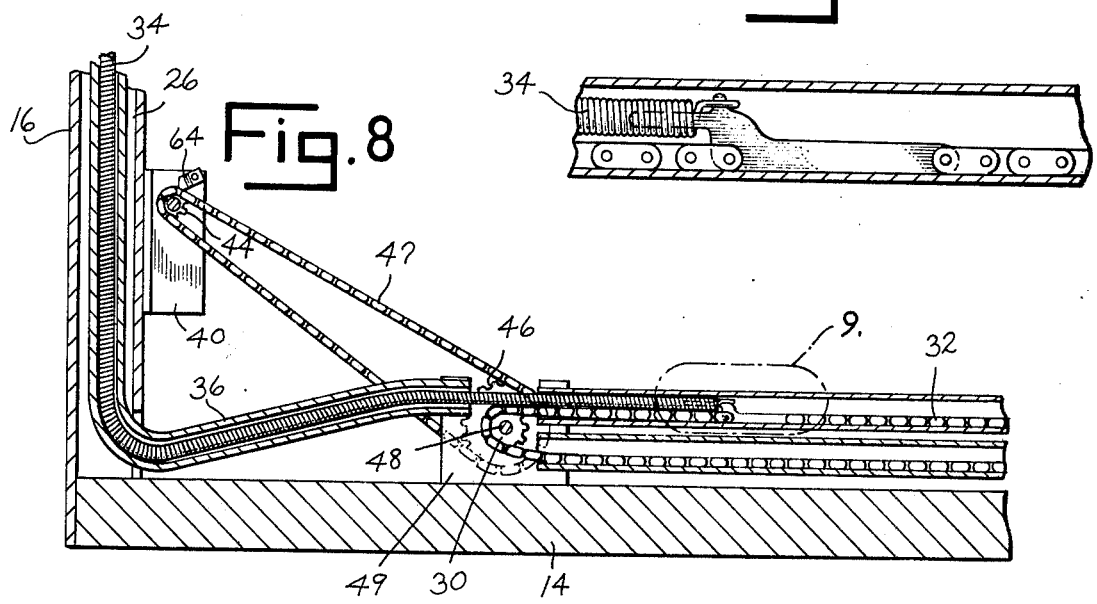
Fig. 8
Fig. 9

LIFT MECHANISM FOR A CAMPER TOP

SUMMARY OF THE INVENTION

This invention relates to a camper having a top which can be shifted between elevated and collapsed positions and will have specific application to an improved lift mechanism for raising and lowering the top between its elevated and collapsed positions.

The camper of this invention includes a wheeled body and a top which is shifted upon endwise movement of guided elongated flexible components between a lowered, collapsed position spanning the wheeled body and a raised, elevated position spaced above the body. A lift mechanism is utilized to shift the flexible components for raising and lowering the camper top. The lift mechanism includes a crank actuated power transmitting means having a shaft journaled in the wheeled body. An engagement means, such as a pulley or sprocket, is secured to the shaft. A flexible drive chain or belt extends about the engagement means and is associated with the flexible components, such as in the manner disclosed in U.S. Pat. Nos. 3,495,866 and 3,885,826, for imparting endwise movement to the flexible components. The ratchet wheel is journaled upon the shaft with one end of the shaft being threaded to accommodate a nut. A crank engages the nut which when turned onto the shaft causes the shaft to shift slightly axially, compressing the ratchet wheel between the engagement means and a suitable abutment part. Continued rotation of the crank now causes rotation of the shaft, with the engagement means and ratchet wheel turning in unison to raise the camper top. A pawl engages the ratchet wheel and prevents reverse rotation of the shaft so long as the ratchet wheel remains in a compressed state between the engagement means and abutment part. When it is desired to lower the camper top, the crank is rotated in a reverse direction, causing a loosening of the nut on the shaft. This in turn causes the ratchet wheel to be released between the engagement means and abutment part, allowing the shaft to rotate relative to the ratchet wheel. A similar shaft and ratchet wheel construction has been utilized for several years in the construction of winches manufactured by the Fulton Manufacturing Corporation of Milwaukee, Wisc.

By utilizing the improved lift mechanism of this invention, the camper top can be smoothly raised and safely stopped at its fully elevated or any intermediate position by simply releasing the crank handle. When released, the crank handle will not experience a rapid reversing spin. When desired, the camper top can be lowered in a simple controlled manner.

It is an object of this invention to provide a camper having an improved lift means for raising and lowering the top of the camper.

Another object of this invention is to provide a crank operated lift for a camper top which is of simple and safe operation.

Another object of this invention is to provide an improved lift for a camper top which is crank actuated and which may be raised and lowered with a minimum of effort.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the camper showing the top thereof in its collapsed position.

FIG. 2 is a perspective view of the camper of FIG. 1 showing its top in its elevated position.

FIG. 3 is a fragmentary detailed sectional view taken along line 3—3 of FIG. 2.

FIG. 4 is a fragmentary sectional view taken along line 4—4 of FIG. 3.

FIG. 5 is a fragmentary sectional view of that portion of the lift mechanism of FIG. 3 shown in a second operative position.

FIG. 6 is a perspective view of the camper as seen from the opposite side of that shown in FIG. 2.

FIG. 7 is a vertical sectional view taken along line 7—7 of FIG. 6.

FIG. 8 is an enlarged view of that portion of FIG. 7 within broken line 8.

FIG. 9 is a detailed view of that portion of FIG. 8 within broken line 9.

DESCRIPTION OF THE PREFERRED EMBODIMENT

The preferred embodiment illustrated is not intended to be exhaustive or to limit the invention to the precise form disclosed. It has been chosen and described in order to best explain the principles of the invention and its application and practical use to thereby enable others skilled in the art to best utilize the invention.

The camper 10 includes a body 12 having a floor 14, sides 16 and ends 17 supported upon an axle and wheel assembly 18. A suitable hitch 20 is connected to body 12 for the purpose of securing camper 10 to a towing vehicle. Camper 10 includes a top 22. A post 24 is secured to each corner of top 22 and fits telescopically into a guide 26 incorporated into the adjacent side 16 of camper body 12. Top 22 is shiftable between a collapsed or closed position as illustrated in FIG. 1 and an extended or open position as illustrated in FIGS. 2 and 6. A pair of laterally spaced sprockets 30 is mounted at each end 17 of camper body 12. The endless drive chain 32 passes around each pair of sprockets 30. An elongated flexible helical spring 34 or similar incompressible flexible member extends through each guide 26 and has its upper end portion secured to telescopically interfitting post 24. The lower end portion of each spring 34 extends through a generally right angular guide member 36 and is secured to a drive chain 32. At each end 17 of camper body 12 one spring 34 has its lower end portion secured to the upper run of the adjacent drive chain 32 and the other spring 34 has its lower end portion secured to the lower run of the adjacent drive chain. Rotation of drive chains 32 causes the joint endwise movement of springs 34 and the resulting shifting of camper top 22 between its collapsed and extended positions. As thus far described, camper 10 is of a common commercially available construction.

The improvement of this invention relates to the means by which drive chains 32 can be rotated to raise and lower camper top 22. A shaft 38 extends along body 12 paralleling one of its sides 16 and the axes of rotation of sprockets 30. A bracket 40 is secured to camper body 12 near each end of shaft 38. Each bracket 40 carries a bearing member 42 in which shaft 38 is journaled. Bearing member 42 while serving to support shaft 38 for rotation also permits the shaft to shift axially relative to the bearing member. A sprocket 44 is secured to each end portion of shaft 38 adjacent a bracket 40. Each sprocket 30 is carried upon a shaft 48 journaled in a floor mounted bracket 49. A sprocket 46 is secured to the shaft 48 of one sprocket 30 at each end of the camper. An endless drive chain 47 passes about each sprocket 44 and sprocket 46 so that upon rotation of shaft 38 drive chains 32 at the ends of camper body 12 will rotate simultaneously, causing the simultaneous endwise movement of connected springs 34.

An opening 50 is formed in one end 17 of camper body 12 in alignment with shaft 38. One end portion 52 of shaft 38 projects into opening 50. A ratchet wheel 54 is journaled upon shaft 38 and is positioned between sprocket 44 and bearing member 42 adjacent opening 50 in body end 17. A washer 56 may be located between ratchet wheel 54 and sprocket 44. Threads 58 are formed upon end portion 52 of shaft 38. A drive nut 60 engages threads 58 and is retained upon end portion 52 of shaft 38 by a lock ring 62 which is secured to the end of the shaft. Threads 58 are sufficiently spaced from lock ring 62 so as to enable nut 60 to be disengaged from the threads while being retained upon end portion 52 of the shaft. Shaft end portion 52 and nut 60 are recessed within opening 50 in camper body 12.

A pawl 64 is pivotally secured to bracket 40 and positioned so as to engage ratchet wheel 54, as illustrated in FIG. 4. A hand crank 66 is inserted from the exterior into opening 50 in camper body 12 and engages nut 60. On rotation of crank 66 in a clockwise direction, nut 60 is turned onto threads 58 with the nut being brought to bear against the inner race 43 of bearing member 42. Continued turning of crank 66 and nut 60 when abutting the inner race 43 of bearing 42 causes shaft 38 to be drawn axially toward the nut with ratchet wheel 54 being compressed between sprocket 44 and the opposite side of the bearing inner race. When ratchet wheel 54 has been sufficiently compressed between sprocket 44 and bearing member 42, shaft 38 and the ratchet wheel will rotate as a unit upon the continued rotation of crank 66. In the illustrated embodiment, the clockwise rotation of crank 66 is indicated by arrow 68 in FIG. 2. Pawl 64 slides over the teeth of ratchet wheel 54 as the wheel turns with shaft 38. Rotation of shaft 38 causes the simultaneous rotation of connected sprockets 46 and 30 and the rotation of guide chains 32. Rotation of guide chains 32 in turn causes the endwise movement of springs 34 which raise the camper top into its elevated position, as illustrated by arrows 70 in FIG. 2. The rotation of crank 66 may be stopped, and, if desired, the crank removed when top 22 is in its fully extended position or at any intermediate position between its fully extended and collapsed positions with pawl 64 engaging the teeth of ratchet wheel 54 to hold the shaft 38 in a fixed non-rotative position. Ratchet wheel 54 remains compressed between sprocket 44 and bearing member 42 with nut 60 bearing against the opposite side of the bearing member. When it is desired to lower top 22, crank 66 is again engaged with nut 60 and the nut rotated counterclockwise causing its loosening upon threads 58 and a freeing of ratchet wheel 54 from its compressed state between sprocket 44 and bearing member 42. With ratchet wheel 54 so freed, the shaft may now rotate relative to the ratchet wheel allowing reverse rotation of sprockets 44 and endwise movement of springs 34 to draw the springs downwardly. Continued counterclockwise rotation of shaft 38 will have a tendency to cause nut 60 to be turned upon shaft threads 58 with ratchet wheel 54 being recompressed between sprocket 44 and bearing member 42. Sufficient compression of ratchet wheel 54 to lock the wheel to shaft 38 and thus stop the descent of top 22 is prevented by the continued turning of crank 66. During the lowering of top 22, crank 66 can be released with ratchet wheel 54 being recompressed, secured to shaft 38, and locked against rotation by pawl 64 to stop downward movement of the top, preventing runaway rotation of the crank. When top 22 is in its collapsed position as shown in FIG. 1, or in its fully elevated position, crank 66 is removed and stored.

It is to be understood that the invention is not to be limited to the details above given but may be modified within the scope of the appended claims.

What I claim is:

1. In a camper having a wheeled body which includes side and end walls and a top shiftable between a collapsed position over said body and an elevated position spaced above said body, telescopic post means adjacent each corner of said body extending between the body and said top, guided elongated substantially incompressible flexible means associated with each telescopic post means for shifting said top between its collapsed and elevated positions upon endwise movement, power transmitting means, said power transmitting means including a shaft journaled in said body and an engagement member secured to said shaft for rotation with the shaft, flexible drive member means passing around said engagement member and being associated with said flexible means for imparting said endwise movement to the flexible means upon rotation of said shaft, the improvement wherein one end portion of said shaft projects into an opening in one of said body side and end walls, bearing means journaling said shaft end portion for rotation and for axial movement relative to said one body wall, said bearing means including an abutment part, a ratchet wheel journaled upon said shaft and located between said engagement member and bearing means abutment part, a pawl carried by said body and engageable with said ratchet wheel to interlock with the wheel when said shaft attempts to turn in one direction, said shaft end portion terminating in an end and having a threaded part located between said end and bearing means abutment part, nut means carried by said shaft end portion and turned upon said shaft threaded part, said nut means having a first operative position spaced from said bearing means when turned in said one shaft rotative direction, said nut means having a second operative position abutting said bearing means when turned in the opposite direction to cause said shaft to be shifted axially compressing said ratchet wheel between said engagement member and bearing means abutment part for rotation with the shaft, said pawl engaging said ratchet wheel to prevent rotation of said shaft in said one shaft rotative direction when said nut means is in its second operative position, and crank means for engaging said nut means to turn said nut means between its first and second operative positions.

2. The camper of claim 1 wherein said shaft threaded part is spaced from said shaft end, retainer means carried at said shaft end for securing said nut means upon said shaft end portion.

3. The camper of claim 1 wherein said shaft end portion is recessed within said wall opening.

4. The camper of claim 1 and a second engagement member secured to said shaft, said first mentioned engagement member located adjacent a said wall of the body and said second engagement member located adjacent an opposite said wall of the body, a second flexible drive member means passing around said second engagement member and being associated with said flexible means for imparting said endwise movement to the flexible means upon rotation of said shaft.

5. The camper of claim 4 wherein said flexible means includes four elements each having one end extending to a telescopic post means, said first mentioned engagement member associated with two of said elements and said second engagement member associated with the other two of said elements.

6. The camper of claim 5 wherein each engagement member is a sprocket and each drive member means is a chain.

7. The camper of claim 6 wherein each element is an elongated helical spring.

* * * * *